United States Patent [19]

Johnson

[11] 4,372,639
[45] Feb. 8, 1983

[54] DIRECTIONAL DIFFUSING SCREEN

[75] Inventor: Kenneth C. Johnson, El Cerrito, Calif.

[73] Assignee: Hughes Aircraft Company, Culver City, Calif.

[21] Appl. No.: 270,159

[22] Filed: Jun. 3, 1981

[51] Int. Cl.³ .................................................. G02B 5/32
[52] U.S. Cl. .................................. 350/3.7; 350/331 R
[58] Field of Search ......................... 350/3.6, 3.7, 3.85, 350/3.86, 330, 331 R, 345

[56] References Cited

U.S. PATENT DOCUMENTS

| | | | |
|---|---|---|---|
| 3,619,021 | 11/1971 | Biedermann | 350/3.7 |
| 3,708,217 | 1/1973 | McMahon | 350/3.7 |
| 3,901,578 | 8/1975 | Hudson | 350/3.7 |
| 3,909,111 | 9/1975 | Meyerhofer | 350/3.7 |
| 3,915,548 | 10/1975 | Opittek et al. | 350/331 R |

Primary Examiner—Bruce Y. Arnold
Attorney, Agent, or Firm—Allen A. Dicke, Jr.; W. H. MacAllister; A. W. Karambelas

[57] ABSTRACT

A method and apparatus for presenting real-time information for viewing is disclosed wherein a projection lens projects an image of a liquid crystal display onto the surface of a holographic optical element diffuser. The liquid crystal display is driven so as to contain real-time information and is illuminated by substantially monochromatic light. The diffuser diffracts the real-time information to a pupil at a viewing focal plane with preselected illumination intensity so that the real-time information can be viewed in diffuse form anywhere across the pupil.

5 Claims, 7 Drawing Figures

DIRECTIONAL DIFFUSING SCREEN

BACKGROUND OF THE INVENTION

This invention is directed to a holographic optical element directional diffusing screen by which monochromatic light striking the screen is diffused and directed by the screen. The screen may be a reflection or refraction holographic optical element. The exiting light is selectively distributed within a designated exit cone. The exit cone may have a central ray which is directed significantly away from the direction of impingement of monochromatic light on the rear surface.

The performance of a display for viewing by an observer is limited by the brightness and resolution of the image as perceived by a person in the viewing zone. In most cases the brightness of the image in a particular portion of a screen varies with the viewer's position. The screen is not at the same brightness over the whole area, and the distribution of the light is dependent upon the viewer's position within the viewing zone. This type of distribution of light on the screen makes it difficult for the viewer to observe all parts of the viewing screen and extract information therefrom with reliability. Therefore, in many cases a screen of uniform brightness is desirable. In other cases a selected variation of brightness over the viewing area or pupil may be desired. Furthermore, it is desirable to be able to define a viewing pupil through which the majority of the light from the display screen is delivered. When the light can be delivered through a defined viewing pupil, with little scattering elsewhere, then brightness is controlled and enhanced because little light is wasted to scattering.

These purposes can be achieved by a display screen which is made by holographic exposure techniques which provide a diffusing screen of uniquely different characteristics as compared to a conventional ground glass diffusing screen. With such a screen the light leaving the screen is selectively distributed within a designated exit cone which may deviate significantly in angle from the direction of light impingement onto the screen. The directional diffusing screen so constructed is in essence a hologram that reconstructs a real image of a diffuse disc when illuminated by the appropriate reference beam. The parts of the hologram which are illuminated by the reference beam will themselves appear bright when viewed from the viewing pupil.

Prior work has been done on applications of holographic optical elements as viewing screens. For example see the article by Dietrich Meyerhofer in Applied Optics, Volume 12, Number 9, Sept. 9, 1973, at pages 2180 to 2184 entitled "Holographic and Interferometric Viewing Screens." Reference should also be made to American Journal of Physics 37:748 and Journal of the Optical Society of America 60:1635.

SUMMARY

In order to aid in the understanding of this invention it can be stated in essentially summary form that it is directed to a directional diffusing screen in the form of a holographic optical element which has exposure details therein which cause an image projected on the face thereof to be viewed through a predetermined viewing pupil, with all the image energy being substantially transferred through the pupil and with the screen being selectively brightly illuminated.

It is a purpose and advantage of this invention to provide a directional diffusing screen in a form holographic optical element which produces a diffuse screen image which is illuminated in a desired intensity distribution in a predetermined viewing pupil. It is another purpose and advantage to provide a holographic optical element which acts as a directional diffusing screen when illuminated with monochromatic light. In the holographic optical element of this invention the output pupil position which defines the viewing zone can be positioned independently of the input illumination angle and substantially all of the illumination energy can be directed to the viewing pupil so that the entire diffusing screen is selectively illuminated.

Other purposes and advantages of this invention will become apparent from a study of the following portion of the specification, the claims and the attacted drawings.

DESCRIPTION OF THE PREFERRED EMBODIMENT

Figure 1:
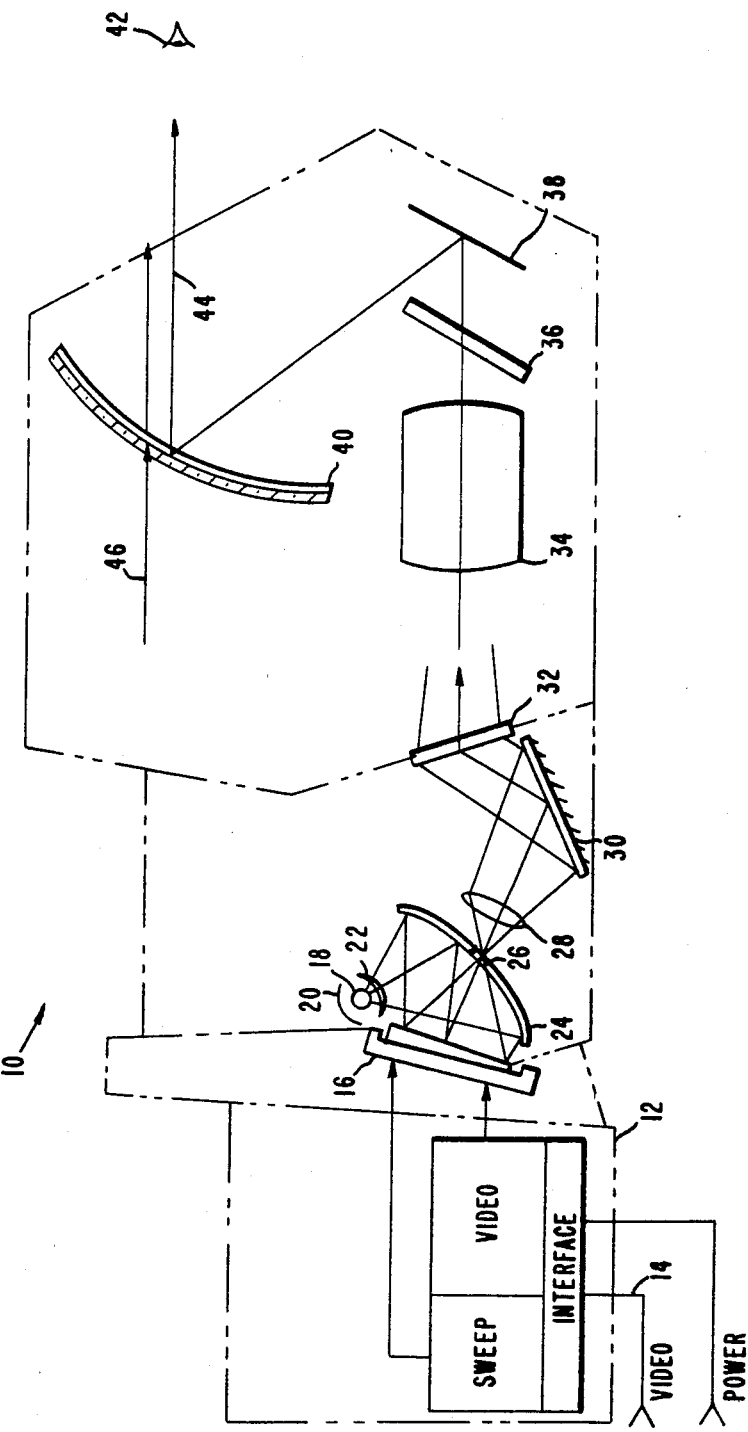
FIG. 1 is a schematic side elevational view of an optical system which incorporates the directional diffusing screen of this invention.

The display system 10 illustrated in FIG. 1, is a system by which a real image and a data display image can be combined for simultaneous seeing by a viewer. This is accomplished by providing an electronic system 12 which receives data through data line 14 to drive liquid crystal display 16. The information on the surface of liquid crystal display 16 can be viewed by reflected light.

Lamp 18 with its reflector 20 projects substantially monochromatic light through filter 22 onto reflecting mirror 24 which delivers light to the liquid crystal display 16 by which the liquid crystal display is illuminated. The liquid crystal display is of such nature that data thereon occurs as different reflectivity so that the data may be visually observed. The illumination of liquid crystal display 16 is projected through viewing port 26 and through a projection lens 28. Mirror 30 folds the optical path and the light is delivered to the directional diffusing screen 32 of this invention at the focal plane.

Light from diffusing screen 32 is delivered through relay optics 34 and through filter 36 to mirror 38. Mirror 38 delivers the energy to holographic optical element combiner 40. Viewer 42 sees a first set of information along optical path 44 in which the diffuse image of information on liquid crystal display 16 is seen. In addition, he sees a second set of information along the second optical path 46 which may be a view of the real world. Since the holographic optical element combiner 40 reflects only in the specified wavelength, it is virtually transparent to optical information along the second path 46, which presumably is on a broad spectrum, for example a real world view. Viewer 42 thus sees the information displayed on liquid crystal display 16 as superimposed upon real world information. Directional diffusing screen 32, which is a holographic optical element, has properties which provide illumination of selected intensity distribution such as uniform into a pupil. In this case the pupil is the entrance pupil to relay optics 34. Thus, substantially all of the energy from the directional diffusing screen 32 is conserved in the system to enhance the brightness of the display seen by the viewer on the holographic optical element combiner 40.

This is one illustration of a structure in which a directional diffusing screen is useful. Other structures include microfilm readers and the like, wherever a diffused display can be enhanced by intensity across a viewing pupil.

Figure 2:
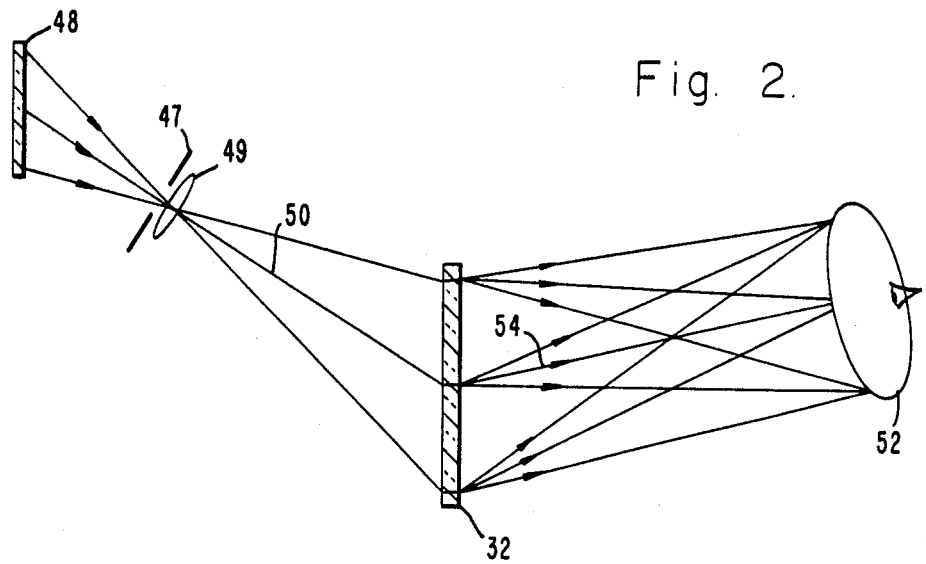
FIG. 2 illustrates the pupil illumination by which the field of view is defined.

FIG. 2 illustrates the function of the directional diffusing screen 32 of this invention. Light is projected through aperture 47 by lens 49 from focal plane 48 onto directional diffusing screen 32. The projection from the focal plane 48 through lens 49 includes a central ray 50, which need not be normal to the plane of directional diffusing screen 32. Directional diffusing screen 32 has two properties. First it diffuses substantially all of the incoming energy into a predetermined viewing pupil 52 which is illustrated as being of circular configuration and has a selected pupil diameter. The central ray 54 from directional diffusing screen 32 to the center of pupil 52 also need not be normal to the surface of directional diffusing screen 32. In the illustration shown in FIG. 2, neither of the central rays 50 or 54 are normal to screen 32, and they are not parallel or coincident to each other. This is one of the properties of directional diffusing screen 32. The other property is that substantially all of the energy from the directional diffusing screen appears at pupil 52.

Figure 3:
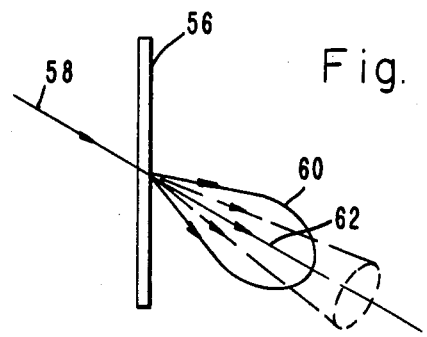
FIG. 3 is a schematic diagram of a typical radiation pattern of a standard ground glass diffusing screen.
Figure 4:
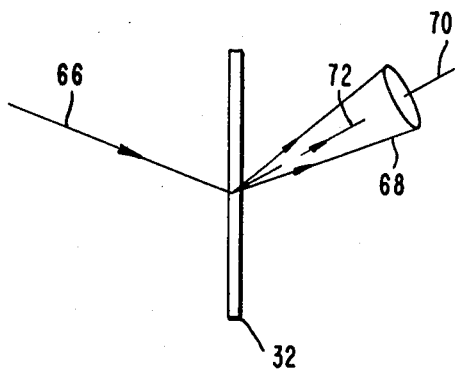
FIG. 4 is a schematic diagram of the radiation pattern of the directional diffusing screen of this invention.

FIGS. 3 and 4 illustrate these features with more particularity. Diffusing screen 56 is a prior art structure, such as a ground glass. Incoming ray 58 is diffused into an energy envelope 60 which is of a typical shape similar to a tear drop or an ellipse depending on the characteristics of screen 56. The shape of the energy envelope 60 represents the tips of the illumination vectors. At a larger diffusion angle from the central ray 62, which is coaxial with incoming ray 58, the intensity is less. Thus, for each ray angle the intensity is different. As one moves his viewing point away from central ray 62, illumination intensity decreases as is indicated by the shape of envelope 60. The dashed lines in FIG. 3 illustrate the intensity distribution if the diffused energy was restricted to a cone.

This is to be contrasted to the properties of the directional diffusing screen of this invention. The directional diffusing screen 32 of this invention is shown in FIG. 4. Incoming ray 66 is diffused by screen 32 into a conical envelope 68 with a viewing or output pupil 70. The envelope 68 is structured in the same way as envelope 60, in that each of the vectors in the envelope represents the direction of illumination and intensity of illumination in that direction. Each of the vectors directed toward the pupil 70 is of the same length, so that when viewed anywhere in the pupil 70, the light intensity remains the same. Uniform intensity across the pupil is selected as preferred in the present illustrative use. However, the holographic optical element diffusing screen can be configured to give a different energy distribution, if desired. The directional diffusing screen 32 has the property that little energy is dissipated outside of the envelope 68. In addition, the central ray 72 in the envelope need not be parallel to or coincident with incoming ray 66. Neither the incoming ray nor the central ray 72 need be normal to the directional diffusing screen 32. If desired, either or both may be normal to that surface.

Figure 5:
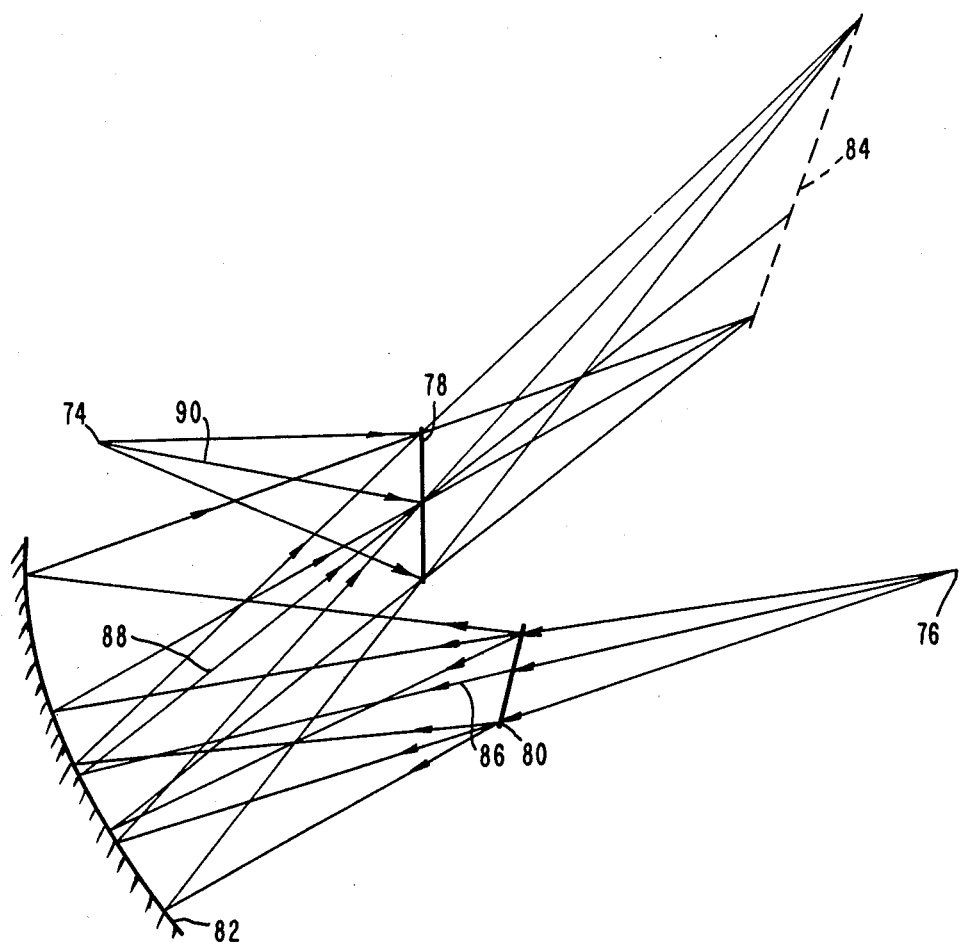
FIG. 5 is a schematic diagram of typical reflective construction optics by which the directional diffusing screen illustrated in FIG. 1 is made.
Figure 6:
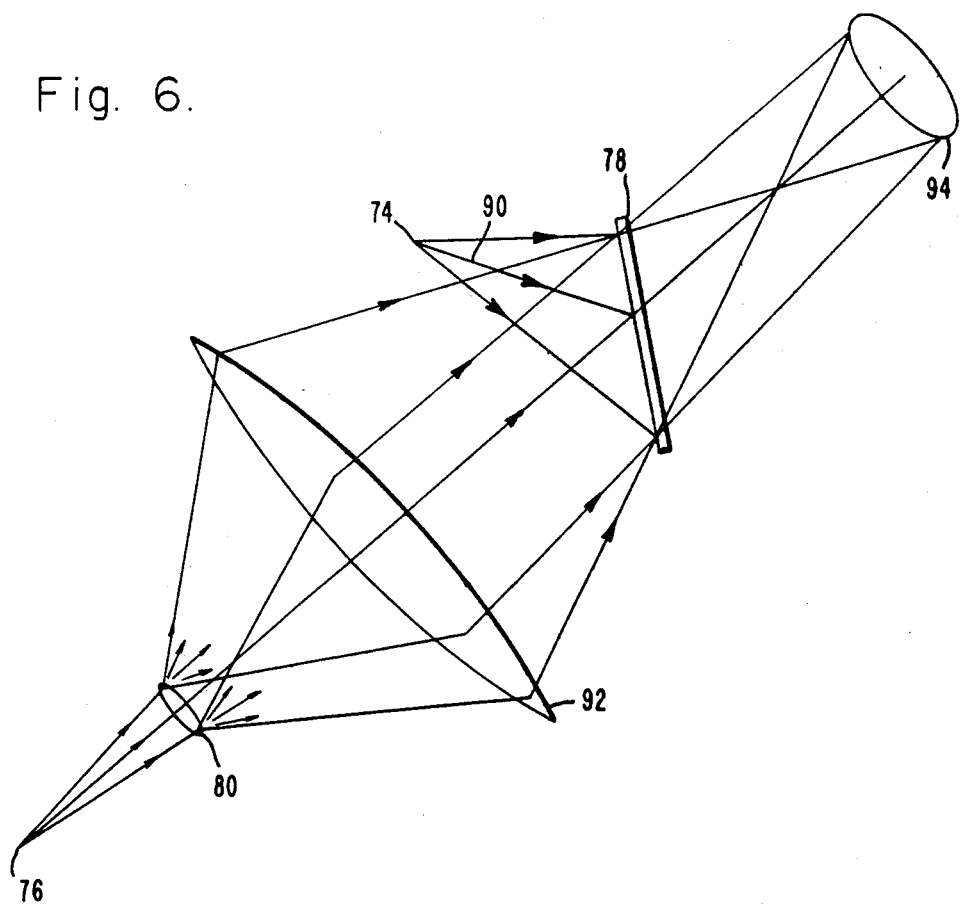
FIG. 6 is another schematic diagram of typical construction optics, similar to FIG. 5 but using a refracting lens instead of a reflecting mirror.

FIGS. 5 and 6 illustrate the manner in which the directional diffusing screen 32 can be made. In FIGS. 5 and 6, point sources of focused coherent monochromatic light are shown at 74 and 76. Preferably they are the same source, suitably optically connected. Holographic sensitive plate 78 is to be exposed and developed to become the directional diffusing screen 32. Holographic sensitive plate 78 can be any conventional holographic recording medium and technique. A particular example is described in more detail in U.S. Pat. No. 4,318,970 to I. J. Kurland et al. In that patent, the chemical character of the plate, its exposure and exposure sensitivity and its development are described in detail. The disclosure of that patent is incorporated herein in its entirety by this reference. In order to provide suitable exposure, interfering wavefronts within the plate cause a latent image which can be developed to cause minute internal refractions. Point source 74 illuminates plate 78 and represents the direction of incoming light from the source which will later illuminate the developed directional diffusing screen 32. The central ray 90 from point source 74 to the plate 78 represents the central ray 50 to the screen 32 in FIG. 2.

Point source 76 illuminates diffusing screen 80 which is of ordinary characteristics. For example, it may be of ground glass. In FIG. 5 the image of the illuminated diffusing screen 80 is focused by mirror 82 toward an image plane 84, which represents the output pupil 52 of FIG. 2. Typically mirror 80 images point source 76 at the region of plate 78. The central ray 86 from the center of diffusing screen 80 reflects on projection mirror 82. The reflected central ray 88 impinges on the center of hologram sensitive plate 78 and is directed toward image plane 84 which corresponds to the later viewing pupil (or entrance pupil of relay optics). The central ray 90 from point source 74 is also illustrated. The illumination from diffusing screen 80 and from point source 74 cause the production of a latent image on holographic sensitive plate 78. This plate is then developed to become directional diffusing screen 32. When the directional diffusing screen 32 is illuminated from a monochromatic source, then at pupil 52 is seen an image of the ground glass diffusing screen 80. Due to the uniform illumination of diffusing screen 80 in the preferred embodiment, illumination is uniform across the pupil 52.

The schematic exposure assembly illustrated in FIG. 6 is quite similar. In this case, point source 74 of coherent monochromatic light illuminates holographic sensitive plate 78. Furthermore, point source 76 of monochromatic coherent light illuminates diffusing screen 80. The two point sources are of related coherence or are preferably the same source, optically connected. In this case, lens 92 focuses the image of diffusing screen 80 through sensitive plate 78 to image plane 94. The interference of the wavefronts passing through the sensitive plate 78 creates a latent image therein which is then developed to provide the directional diffusing screen 32. After this screen is developed, when it is illuminated from a point source 74, the image of the ground glass is seen at the image plane or pupil 94. It is apparent from FIGS. 5 and 6 that the large lens 92 is difficult to provide and the mirror 82 is the optical equivalent thereof.

In the described preferred embodiment, screen 32 is a transmission holographic optical elements. By similar technics a reflection holographic optical element can be produced to have similar characteristics.

Figure 7:
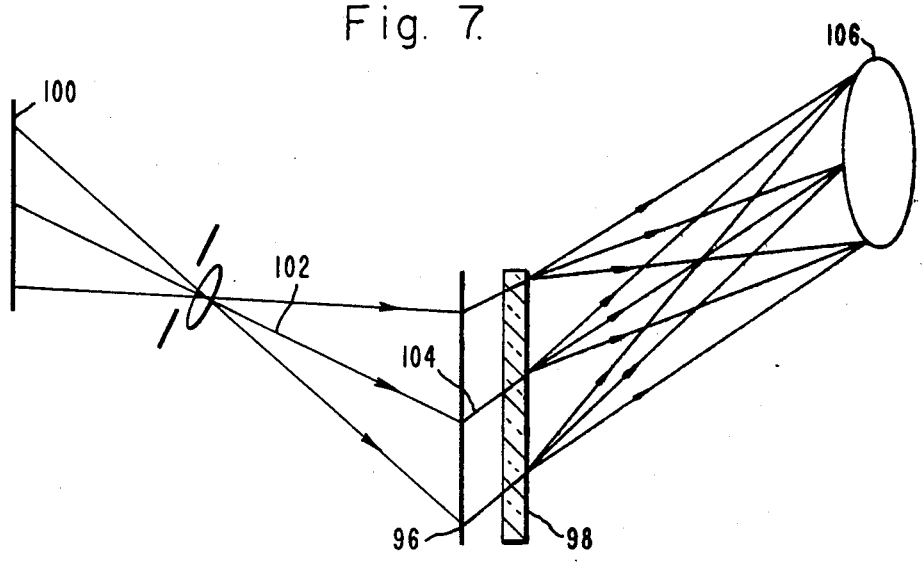
FIG. 7 is a diagram similar to FIG. 2, but showing the directional holographic optical element and the diffusing screen holographic optical element as separate elements.

Directional diffusing screen 32 is of such nature that it presents a predefined pupil through which is seen the image of a diffusing screen, and the angle of entrance illumination may be different than the central ray to the pupil. FIG. 7 illustrates holographic optical element 96 which is in the form of a directional screen and holographic optical element 98 which is in the form of the image of a diffusing screen. The two holographic optical elements 96 and 98 then separately have the directional screen function and the diffusing screen function. Elements 96 and 98 lie closely together. These functions are combined in the directional diffusing screen holographic optical element 32. The illuminated focal plane 100, which may be a visual information source, is focused onto directional screen 98. Its central ray is indicated at 102. Directional screen holographic optical element 96 is formed so that the incoming illumination is redirected so that central ray 104 is at an angle to central ray 102. The redirected image information from directional screen 96 is directed onto holographic optical element diffusion screen 98 which diffuses the optical information into a ray pattern which uniformly illuminates pupil 106, similar to pupil 52. Thus, the directional function and the diffusion function can be separated in separate holographic optical elements adjacent to each other.

This invention has been described in its presently contemplated best mode and it is clear that it is susceptible to numerous modifications, modes and embodiments within the ability of those skilled in the art and without the exercise of the inventive facility. Accordingly, the scope of this invention is defined by the scope of the following claims.

What is claimed is:

1. An optical system comprising:
   an information carrying liquid crystal screen at a first image focal plane, means for driving said liquid crystal screen to provide real-time information;
   means for illuminating said information carrying liquid crystal screen with substantially monochromatic light;
   a holographic optical element at a second image focal plane;
   lens means positioned between said information carrying liquid crystal screen and said holographic optical element for projecting substantially monochromatic light carrying the real-time information carried by said information carrying liquid crystal screen at said first image focal plane onto said holographic optical element at said second focal plane, said projection means providing light rays from said real-time information containing liquid crystal screen to said holographic optical element; and
   diffraction means in said holographic optical element for diffracting a substantial portion of the incoming substantially monochromatic light to a viewing pupil by means of which a ray of light incident on any particular point on said holographic optical element from the lens means is redirected and diffused into a predetermined directional range intercepting a designated pupil region in space, whereby the light diffracted from said incident beam by said holographic optical element is substantially directed within and illuminates said pupil region with selected intensity distribution so that the information at said information carrying liquid crystal screen is viewable at said viewing pupil as diffused information with substantially uniform illumination across said pupil.

2. The optical system of claim 1 wherein said holographic optical element has a surface and said incoming central ray impinges upon said surface at a point at a predetermined angle, the line from said point to the center of said viewing pupil being at a different angle.

3. The optical apparatus of claim 2 wherein the image light impinging upon any particular point on said holographic optical element is angularly separated from the viewing pupil, whereby the zero-order specular light transmitted directly through and undiffracted by said holographic optical element does not enter said pupil region.

4. A method of presenting real-time information for viewing comprising the steps of:
   positioning a liquid crystal display at an information focal plane;
   driving the liquid crystal display to display real-time information thereon;
   illuminating the information carrying liquid crystal screen at the focal plane with substantially monochromatic light;
   projecting through a lens the illuminated image at the liquid crystal screen at the information focal plane onto a diffuser focal plane;
   positioning a holographic optical element diffuser at the diffuser focal plane; and
   diffracting by the diffraction characteristics of the holographic optical element a diffused image of the real-time information to a pupil at a viewing focal plane with preselected illumination intensity across the pupil so that the real-time information can be viewed in diffuse form anywhere across the pupil.

5. The method of claim 4 wherein the information is projected from the information containing focal plane to the holographic optical element with a central ray so that the central ray striking the holographic element and the ray from that point to the center of the pupil is not parallel to the central ray.

* * * * *